United States Patent
Tsujii et al.

[11] Patent Number: 6,048,288
[45] Date of Patent: Apr. 11, 2000

[54] POWER TRAIN SYSTEM FOR A VEHICLE AND METHOD FOR OPERATING SAME

[75] Inventors: Hiroshi Tsujii, Mishima; Hatsuo Nakao, Gotenba; Shuji Nagano, Toyota; Kojiro Kuramochi, Okazaki; Yasuki Nakagawa, Susono, all of Japan

[73] Assignee: Toyota Jidosha Kabushiki Kaisha, Toyota, Japan

[21] Appl. No.: 09/131,854

[22] Filed: Aug. 10, 1998

[30] Foreign Application Priority Data

Nov. 18, 1997 [JP] Japan ................................ 9-317507
Mar. 12, 1998 [JP] Japan ................................ 10-061795

[51] Int. Cl.[7] ................................................ F02N 11/04
[52] U.S. Cl. ............................ 477/5; 475/5; 180/65.4
[58] Field of Search ................... 180/65.2, 65.4; 477/2, 5, 8; 475/5

[56] References Cited

U.S. PATENT DOCUMENTS

| | | | |
|---|---|---|---|
| 4,335,429 | 6/1982 | Kawatsu | 477/5 X |
| 5,492,189 | 2/1996 | Kriegler et al. | 477/2 X |
| 5,558,173 | 9/1996 | Sherman | 180/65.4 X |
| 5,558,175 | 9/1996 | Sherman | 180/65.2 |
| 5,635,805 | 6/1997 | Ibaraki et al. | 180/65.4 X |
| 5,789,882 | 8/1998 | Ibaraki et al. | 180/65.4 X |
| 5,801,499 | 9/1998 | Tsuzuki et al. | 180/65.4 X |
| 5,847,470 | 12/1998 | Mitchell | 180/65.4 X |
| 5,856,709 | 1/1999 | Ibaraki et al. | 475/5 X |
| 5,875,691 | 3/1999 | Hata et al. | 477/8 X |

FOREIGN PATENT DOCUMENTS

| | | |
|---|---|---|
| 60-113040 | 6/1985 | Japan . |
| 60-142030 | 7/1985 | Japan . |
| 2-264153 | 10/1990 | Japan . |
| 7-4284 | 1/1995 | Japan . |
| 9-39613 | 2/1997 | Japan . |

OTHER PUBLICATIONS

Yasushi Ito et al., "Power Train System Installed on a Concept Car For Improving The Fuel Economy", vol. 51, No. 9, 1997.

*Primary Examiner*—Khoi Q. Ta
*Attorney, Agent, or Firm*—Oliff & Berridge, PLC

[57] ABSTRACT

In an economy running mode, auxiliary machines are operated by a motor generator in a state where the engine is stopped so as to reduce electric power consumption. The motor generator, the engine and the auxiliary machines are connected through pulleys and belts. Moreover, a clutch is provided for switching enabling/disabling of power transmission between the motor generator and the engine. A battery is connected to the motor generator through an inverter. When the engine is stopped, the clutch is disengaged and the auxiliary machines are operated by the motor generator.

11 Claims, 8 Drawing Sheets

POWER TRAIN SYSTEM FOR A VEHICLE AND METHOD FOR OPERATING SAME

INCORPORATION BY REFERENCE

The disclosures of Japanese Patent Application Nos. HEI 9-317507 filed on Nov. 18, 1997 and HEI 10-61795 filed on Mar. 12, 1998, including the specifications, drawings and abstracts, are incorporated herein by reference in their entirely.

BACKGROUND OF THE INVENTION

1. Field of the Invention

The present invention relates to a power train system for a vehicle incorporating an engine and a motor. The invention also relates to a method for controlling a power train system.

2. Description of the Related Art

In recent years, an automatic engine stopping and starting apparatus (hereinafter referred to as an "economy running system") has been known for stopping an engine after a running vehicle has been stopped and restarting the engine if conditions for driving the vehicle have been satisfied again. Japanese Patent Laid-Open No. 9-39613, for example, discloses a structure of the above-mentioned apparatus in which a motor generator is connected to an engine through a power distributing mechanism. The automatic engine stopping and starting apparatus is arranged such that fuel supply to the engine is interrupted while the vehicle is stopped, resulting in reduced fuel consumption. Moreover, idle rotation of the engine is maintained by the motor generator during the operation of the automatic engine stopping and starting apparatus (hereinafter referred to an "economy running mode"). The engine is kept to have idle rotation by the motor generator while the vehicle is stopped in order to operate auxiliary machines, such as a compressor for an air conditioner and a pump for a power steering unit during such period.

The above-mentioned structure eliminates the need of electric motors to operate the auxiliary machines, such as the compressor for the air conditioner and the pump for the power steering unit. Thus, the space required for the structure of the economy running system can be minimized.

However, the above-mentioned art to operate the auxiliary machines by maintaining revolution of the engine at the idle speed cannot reduce power consumption of the motor generator for operating the engine. Since the motor generator is, in general, operated by electric power of a battery mounted on the vehicle, power consumption of the battery is increased due to frequent stop operations of the vehicle. As a result, a battery having a large storage capacity must be mounted on the vehicle.

SUMMARY OF THE INVENTION

In view of the foregoing, an object of the present invention is to operate a motor with smaller electric power when a vehicle is stopped.

To achieve the above-mentioned object, according to a first aspect of the present invention, there is provided a connection switching unit disposed between the drive shaft of the engine and a rotational shaft of the motor to enable/disable power transmission between the drive shaft of the engine and the rotational shaft of the motor, and a transmission controller that controls a function of the connection switching unit for enabling/disabling power transmission.

According to a second aspect of the present invention, there is provided a power train system for a vehicle having an engine and a motor connected to a drive shaft of the engine including a transmission mechanism disposed between the engine and the motor and capable of transmitting rotation of the rotational shaft of the motor to the drive shaft of the engine at a changed speed, and an auxiliary machine connected to the rotational shaft of the motor and operated by the engine or the motor. The transmission mechanism reduces the speed of rotation of the rotational shaft of the motor and transmits rotation to the drive shaft of the engine when the auxiliary machine is operated by the motor in a state where the engine is stopped.

According to the first aspect of the present invention, when, for example, the auxiliary machine is operated by a motor while the engine is stopped, control is performed such that rotation of the rotational shaft of the motor is not transmitted to the drive shaft of the engine. Thus, only the auxiliary machine is operated by the motor without operating the engine. Therefore, electric power required for the motor can be reduced.

According to the second aspect of the present invention, when the engine is started by the motor, the rotational speed of the rotational shaft of the motor is changed and the changed rotation is transmitted to the drive shaft of the engine. Therefore, sufficient torque can be obtained from the motor, thus reducing the size of the motor. Assuming that the auxiliary machine is operated by the motor when the engine is stopped, it may be controlled to prevent rotation of the rotational shaft of the motor from being transmitted to the drive shaft of the engine and to drive only the auxiliary machine without driving the engine. As a result, electric power required for the motor can be reduced.

The second aspect of the present invention may be structured such that when the auxiliary machine is operated by the motor while the engine is stopped, the transmitting mechanism may interrupt the transmission of rotation of the rotational shaft of the motor to the drive shaft of the engine.

The first and second aspect of the present invention may have a structure in which the connection switching unit is formed as an electromagnetic clutch for switching a mechanical connection/disconnection between the drive shaft of the engine and the rotational shaft of the motor.

The power train system according to the first or second aspect of the present invention may have a structure in which another power generator is connected to the drive shaft of the engine. The motor may be formed as a so-called motor generator equipped with a power generating mechanism.

According to the second aspect of the present invention, the power train system may further include first and second rotative members having rotational shafts disposed in parallel with the drive shaft of the engine, a first cover joined to the engine to form a first space in association with the engine for accommodating the first rotative member, a second cover joined to an outside of the first cover to form a second space in association with the first cover for accommodating the second rotative member, a motor rotative member provided for the rotational shaft of the motor so as to be rotated in conjunction therewith, and a power transmission that connects the motor rotative member to either the first rotative member or the second rotative member such that power can be transmitted. The motor rotative member and the power transmission are accommodated in either the first space or the second space. As a result of the above-mentioned structure, the rotative member of the motor and the first and second rotative members provided for the drive shaft of the engine are connected with each other by the power transmission. The rotative members and the power transmission are accommodated in a space defined by the body of the engine and the first cover or the second cover joined to the body of the engine. Therefore, the motor can be mounted without considerably changing the structure of a conventional engine. The foregoing structure may be arranged such that the first and second spaces are allowed to communicate with each other and formed into spaces isolated from the outside portion of the engine, and lubricant may be supplied into the first and second spaces. The lubricant may be the one used to lubricate the engine and allowed to circulate to and from the engine.

According to a second aspect of the present invention, there is provided a method for operating a power train system for a vehicle including an engine operable in an economy running mode, an electrically powered motor generator, an auxiliary machine that receives power from at least one of the engine and the motor generator, and a clutch between the engine and the motor generator, the method supplying power to the auxiliary machine from the motor generator when the economy running mode is selected, and disabling the clutch to prevent power from being transferred from the motor generator to the engine when operating in the economy running mode.

These and other aspects will be described in or apparent from the following detailed description of preferred embodiments.

BRIEF DESCRIPTION OF THE DRAWINGS

Preferred embodiments of the present invention will be described in detail with reference to the following drawings where like reference numbers indicate like parts, in which.

DETAILED DESCRIPTION OF PREFERRED EMBODIMENTS

Figure 1:
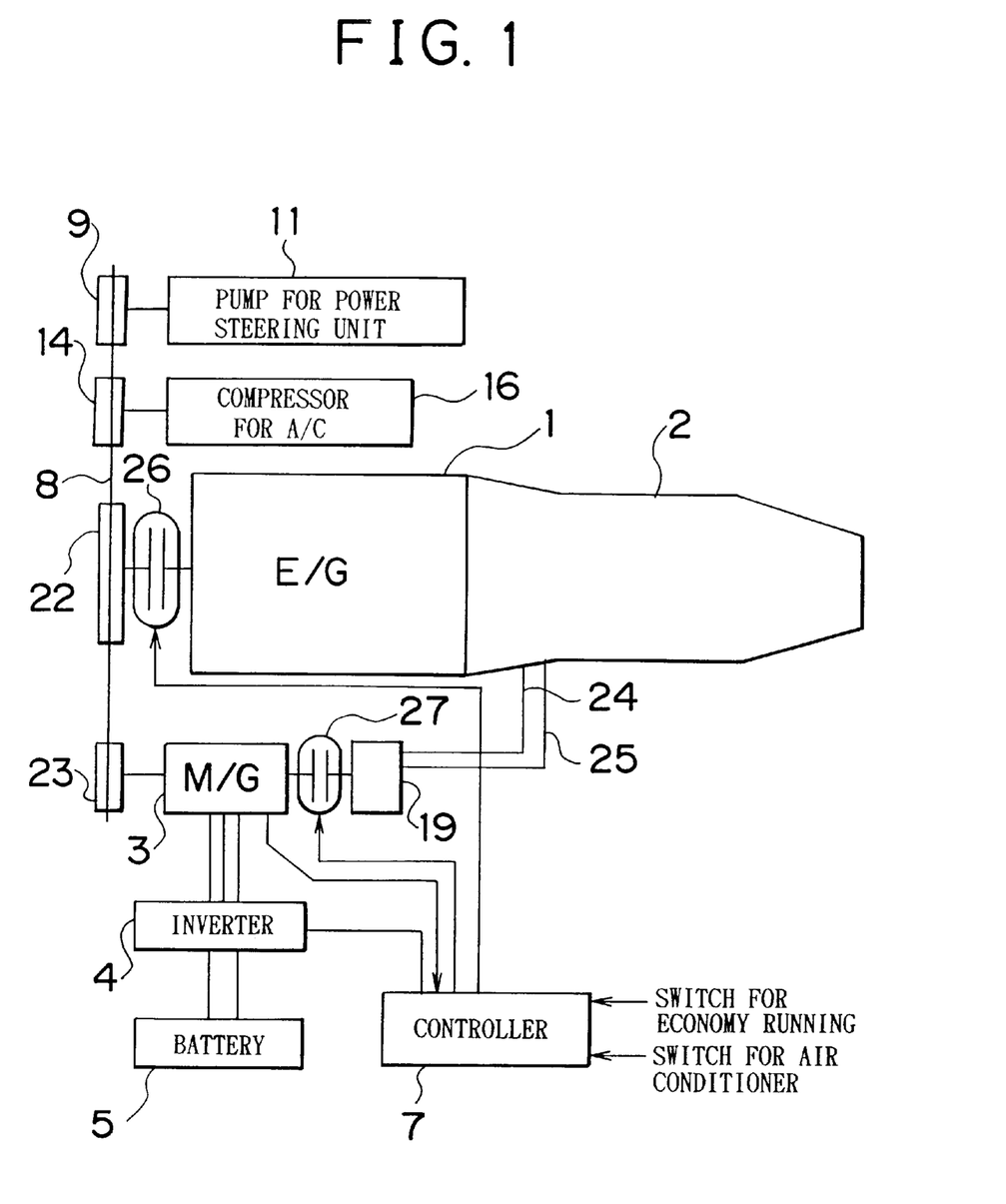
FIG. 1 is a diagram showing a system of a power train system according to a first embodiment of the present invention.

Embodiments of the present invention will now be described with reference to the drawings. FIG. 1 is a diagram showing the system of a power train system according to a first embodiment of the present invention.

Referring to FIG. 1, an engine 1 is mounted on a vehicle including an automatic transmission 2 (hereinafter referred to as an "A/T"), and a motor generator 3 (hereinafter referred to as an "M/G") serves as a motor and a power generator. The M/G 3 is connected to a crank shaft of the engine 1 through a pulley 23, a belt 8 and a pulley 22. An electromagnetic clutch 26 for enabling or disabling electric power supply is disposed between the pulley 23 and the crank shaft of the engine 1. The M/G 3 is connected to an oil pump 19 for the A/T 2 through an electromagnetic clutch 27. An oil inlet pipe 24 is connected to the oil pump 19. An oil outlet pipe 25 is provided for the oil pump 19. Auxiliary machines 11 and 16, such as a pump for a power steering unit and a compressor for an air conditioner, are also provided. The auxiliary machines 11 and 16 are connected to the crank shaft of the engine 1 and the M/G 3 through pulleys 9 and 14 and the belt 8, respectively. Other auxiliary machines, such as an oil pump and a water pump for the engine 1 (not shown) are connected to the crank shaft and the M/G 3. An inverter 4 is electrically connected to the M/G 3. The inverter 4 performs a switching operation to vary the amount of electric energy which is supplied from a battery 5 serving as a power source to the M/G 3 so as to control the number of revolutions of the M/G 3. Moreover, the inverter 4 performs a switching operation to charge electric energy supplied from the M/G 3 to the battery 5. A controller 7 controls engagement/disengagement of the electromagnetic clutches 26, 27 and the switching operation of the inverter 4. The controller 7 receives input signals, such as a signal indicating the number of revolutions of the M/G 3, a switching signal for selecting the economy running mode and a switching signal for operating the air conditioner. Note that lines shown in FIG. 1 and each having an arrow indicate signal lines.

The operation of the first embodiment will now be described. Initially, the M/G 3 is operated to start the engine 1. After starting the engine 1, the M/G 3 acts as a power generator for storing electric energy in the battery 5. It is preferable to perform the operation for charging electric energy at braking of a vehicle. When the engine is started, the controller 7 detects the number of revolutions of the M/G 3. Moreover, the controller 7 causes the inverter 4 to perform a switching operation such that a torque and the number of revolutions required to start the engine 1 are realized. If a signal for switching the air conditioner has been turned ON at starting of the engine, a higher torque is required compared with the OFF state of the air conditioner. Therefore, the controller 7 applies, to the inverter 4, a switching control signal to allow the M/G 3 to rotate at a higher torque with a large number of revolutions. The switching control signal to be output may be determined such that a variety of status signals of the engine 1, the A/T 2 and the vehicle are extracted to the controller 7 so as to be collated with a map memory stored therein. Alternatively, the switching control signal may be determined by calculations performed by a calculating unit disposed in the controller 7. When the engine is started, the electromagnetic clutches 26, 27 are connected.

When an economy-running-mode signal is turned ON while the vehicle is stopped, the controller 7 stops the engine 1 by transmitting a signal for interrupting fuel supply to the engine 1. Note that a line for transmitting the signal for interrupting the fuel supply is omitted from FIG. 1. The economy-running-mode signal is applied to the controller 7, for example, by a driver who depresses a switch disposed in the inside of the vehicle. The economy running operation can be performed at the economy running mode under condition where, for example, the vehicle speed is zero and the shift lever is in the range D or range N. In the foregoing state, the controller 7 transmits, to the electromagnetic clutch 26, a control signal for disconnection. Thus, no power is transmitted between the pulley 22 and the engine 1. On the other hand, the electromagnetic clutch 27 is brought to a connected state to allow the M/G 3 to operate the oil pump 19. This is because the starting clutch (not shown) disposed in the A/T 2 is arranged to be immediately engaged for driving the vehicle smoothly upon re-starting of the engine.

In the case where the air conditioner and the power steering are required to be operated even if the engine 1 is stopped, the controller 7 applies, to the inverter 4, a switching control signal to rotate the M/G 3 at the number of revolutions and the torque corresponding to the loads of the pump 11 for a power steering unit, the compressor 16 for the air conditioner and the oil pump 19 for the A/T 2. When the engine 1 is re-started from a state where the vehicle is stopped, the electromagnetic clutches 26, 27 are connected to rotate the M/G 3 at arbitrary number of revolutions and torque.

As described above, the power train system according to the first embodiment has the structure to stop the engine 1 while the vehicle is stopped and to cause the M/G 3 to operate the pump 11 for a power steering unit and the compressor 16 for the air conditioner. Thus, the power of the M/G 3 is not transmitted to the engine 1. The power consumption can be reduced compared with a structure in which the M/G keeps the engine at the idle speed for operating the compressor for the air conditioner and the pump for the power steering. Since the M/G 3 also serves as the means for operating the pump 11 for a power steering unit and the compressor 16 for the air conditioner, the system can be simplified.

Figure 2:
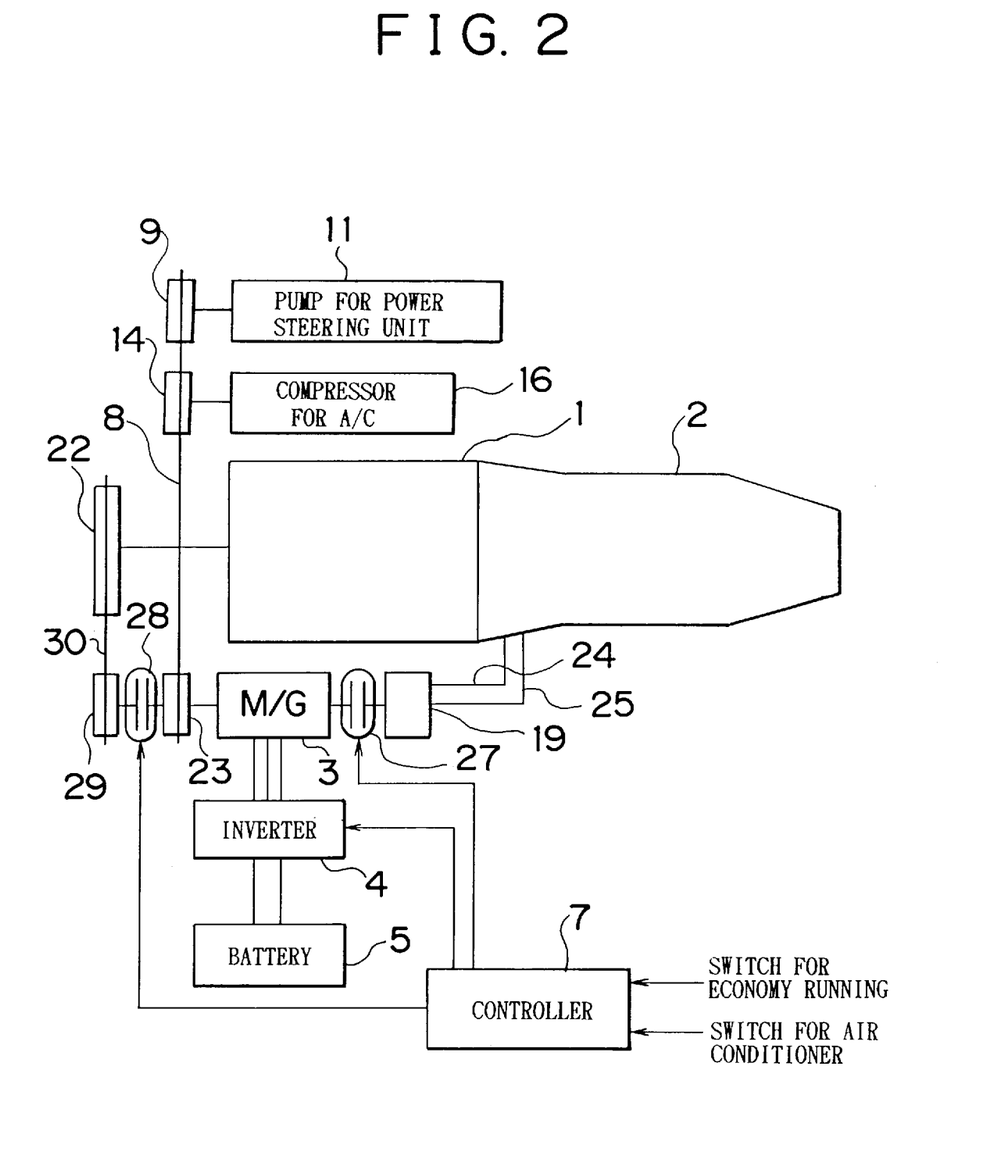
FIG. 2 is a diagram showing a system of a power train system according to a second embodiment of the present invention.

FIG. 2 is a diagram showing a second embodiment of the present invention. The second embodiment is different from the first embodiment shown in FIG. 1 in that a pulley 29 and the pulley 23 are disposed coaxially; an electromagnetic clutch 28 for enabling/disabling power transmission between the engine 1 and the M/G 3 is disposed between the pulley 23 and the pulley 29; and a belt 30 is set between the pulley 22 disposed above the engine 1 and the pulley 29.

The auxiliary machines are operated at the economy running mode while the engine is stopped similarly to those according to the first embodiment. Unlike the first embodiment, the electromagnetic clutch 28 is disposed adjacent to the M/G 3 as described above. Therefore the torque to be transmitted by the electromagnetic clutch 28 can be reduced because the pulley 22 does not have to be operated. Therefore, the size, weight and the cost of the electromagnetic clutch 28 can be reduced. Since the pulley 22 does not have to be operated, electric power required for the M/G 3 can be reduced.

Figure 3:
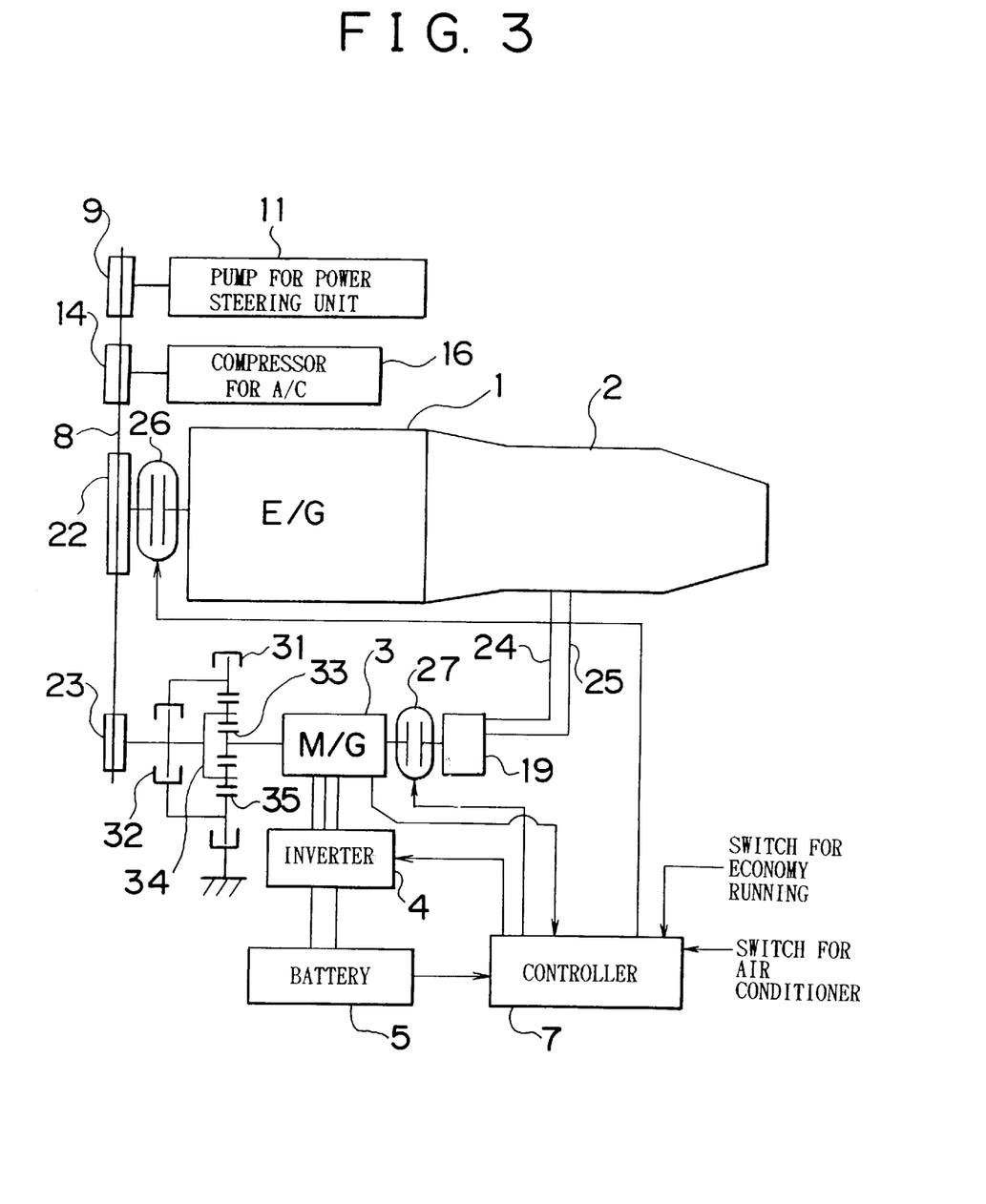
FIG. 3 is a diagram showing a system of a power train system according to a third embodiment of the present invention.
Figure 4:
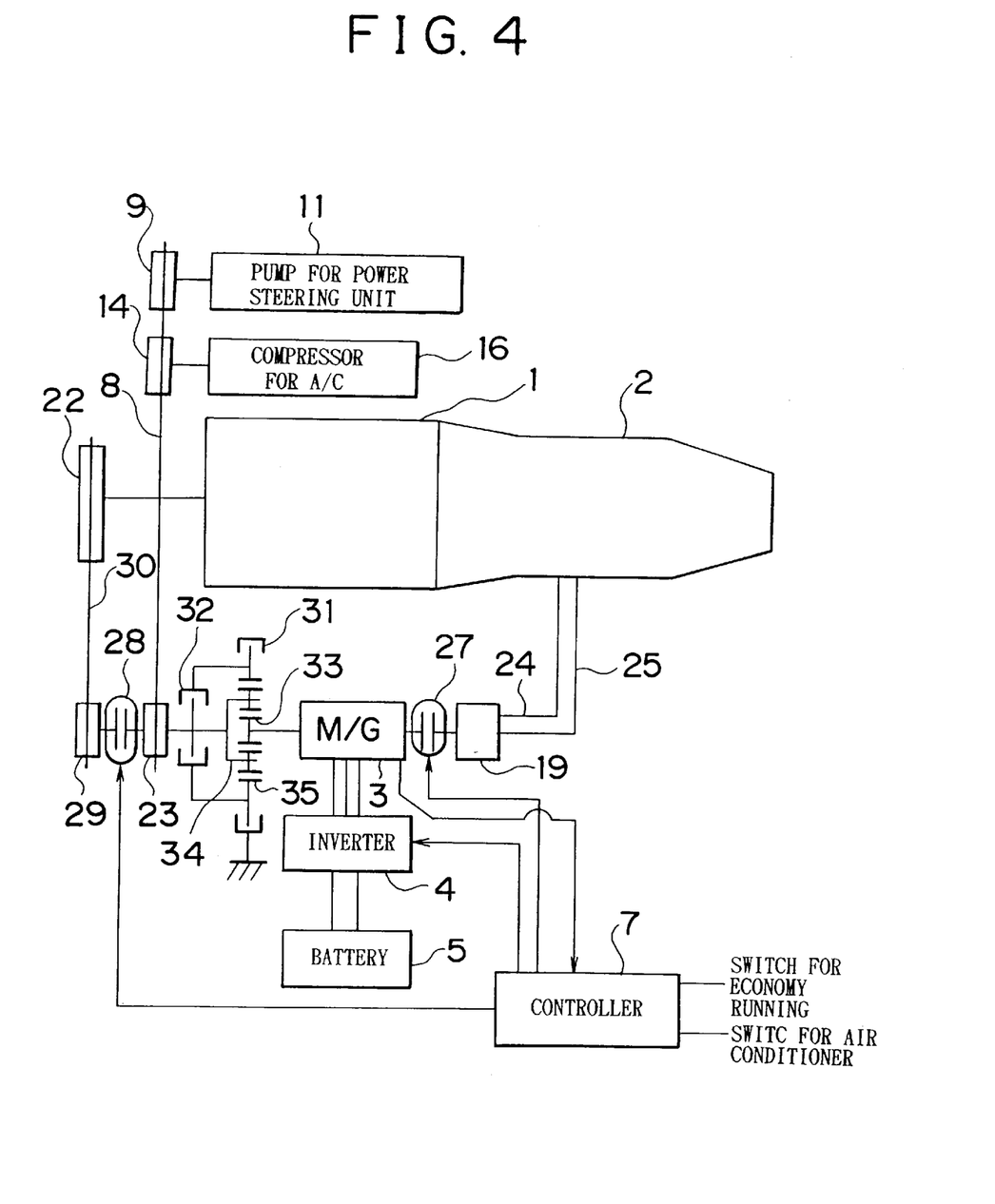
FIG. 4 is a diagram showing a system of a power train system according to a fourth embodiment of the present invention.

FIGS. 3 and 4 are diagrams showing third and fourth embodiments of the present invention respectively. FIG. 3 shows a structure in which reduction mechanisms 33, 34, 35, a brake 31 and a clutch 32 are disposed between the M/G 3 and the pulley 23 as shown in FIG. 1. FIG. 4 shows a structure in which the reduction mechanisms 33, 34, 35, the brake 31 and the clutch 32 are disposed between the M/G 3 and the pulley 23 as shown in FIG. 2. Note that reference numeral 33 represents a sun gear, 34 represents a carrier and 35 represents a ring gear. When the M/G 3 cranks (actuates) the engine 1, the brake 31 is turned ON and the clutch 32 is turned OFF. Thus, the rotational force of the M/G 3 is transmitted at a decreased speed from the sun gear 33 to the carrier 34. As a result, even if the size of each of the M/G 3 and the inverter 4 is reduced, the force required to crank the engine 1 can be maintained. Therefore, electric power required for the M/G 3 can be reduced.

When the pump 11 for a power steering unit and the compressor 16 for the air conditioner as the auxiliary machines are operated by the M/G 3 while the engine 1 is stopped, the brake 31 is turned OFF and the clutch 32 is turned ON. At this time, the electromagnetic clutch 27 is brought to an engaged state and the electromagnetic clutch 26 (identical to the electromagnetic clutch 28 in the structure shown in FIG. 4) is brought to a disengaged state. Thus, the M/G 3 and the pulley 23 are directly connected with each other so that the number of revolutions required to operate the auxiliary machines 11, 16 can be obtained.

When the M/G 3 is used as an electric generator or the auxiliary machines 11, 16 are operated while operating the engine 1, the brake 31 is turned OFF and the clutch 32 is brought to an engaged state. At this time, the electromagnetic clutch 27 is brought to a disengaged state and the electromagnetic clutch 26 (identical to the electromagnetic clutch 28 in the structure shown in FIG. 4) is brought to the engaged state. Thus, the M/G 3 and the pulley 23 are directly connected with each other so that the rotations of the pulley 23 are transmitted to the M/G 3 while maintaining the rotational speed of the pulley 23.

Figure 5:
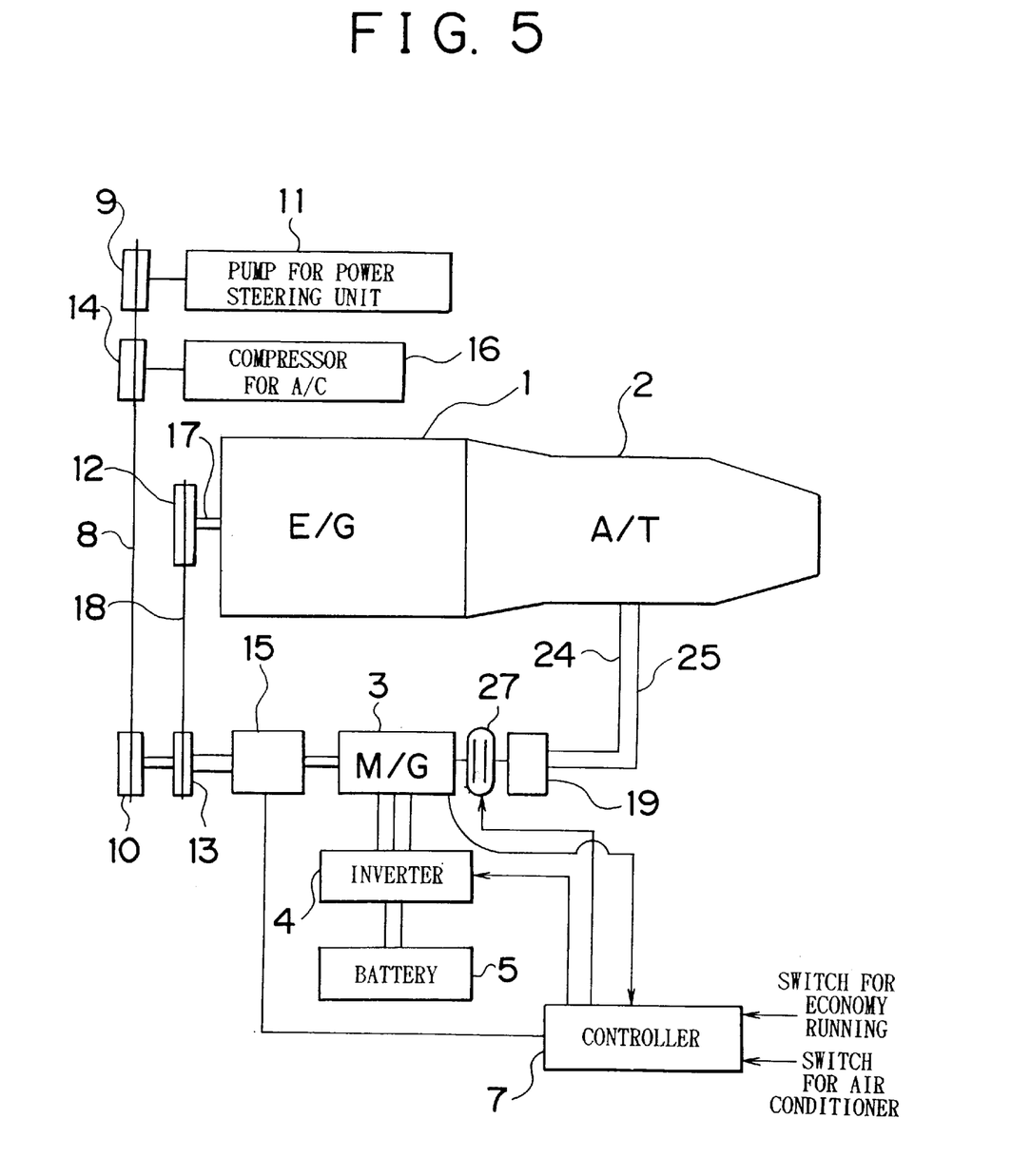
FIG. 5 is a diagram showing a system of a power train system according to a fifth embodiment of the present invention.
Figure 6:
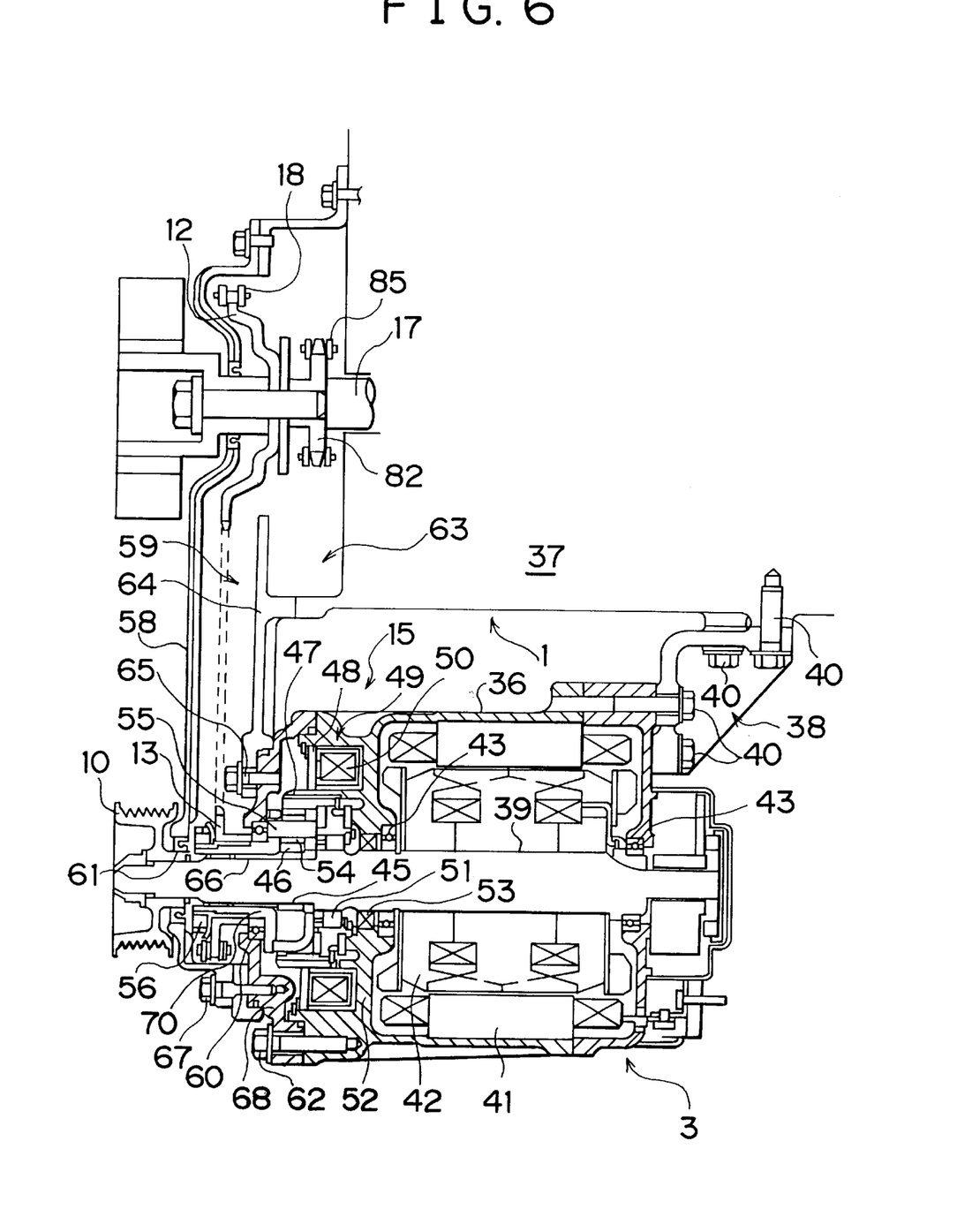
FIG. 6 is a diagram showing detailed structures of a motor generator, a reducing gear and a mounting structure according to the fifth embodiment of the present invention.
Figure 7:
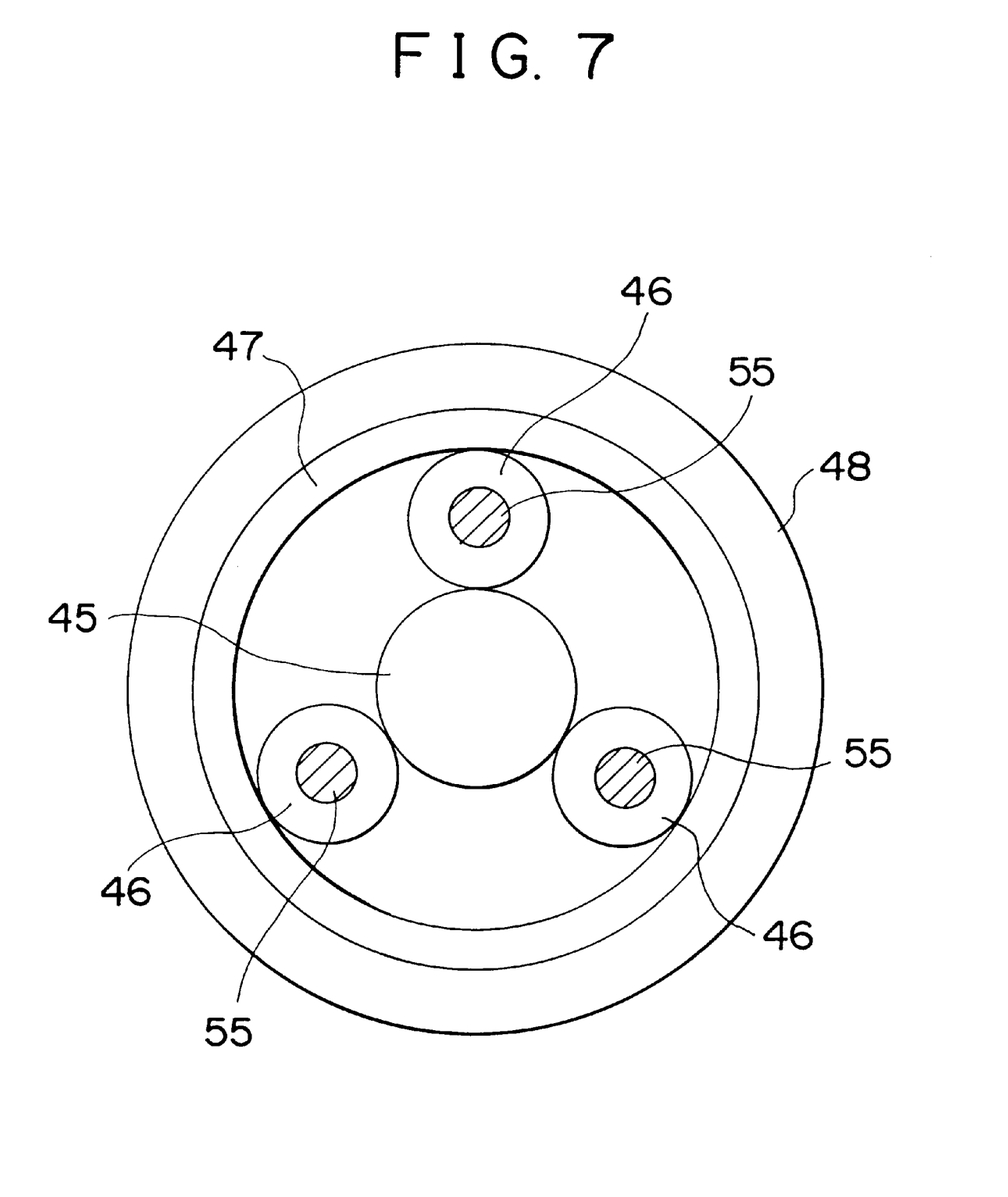
FIG. 7 is a schematic view showing a planetary gear unit according to the fifth embodiment of the present invention.
Figure 8:
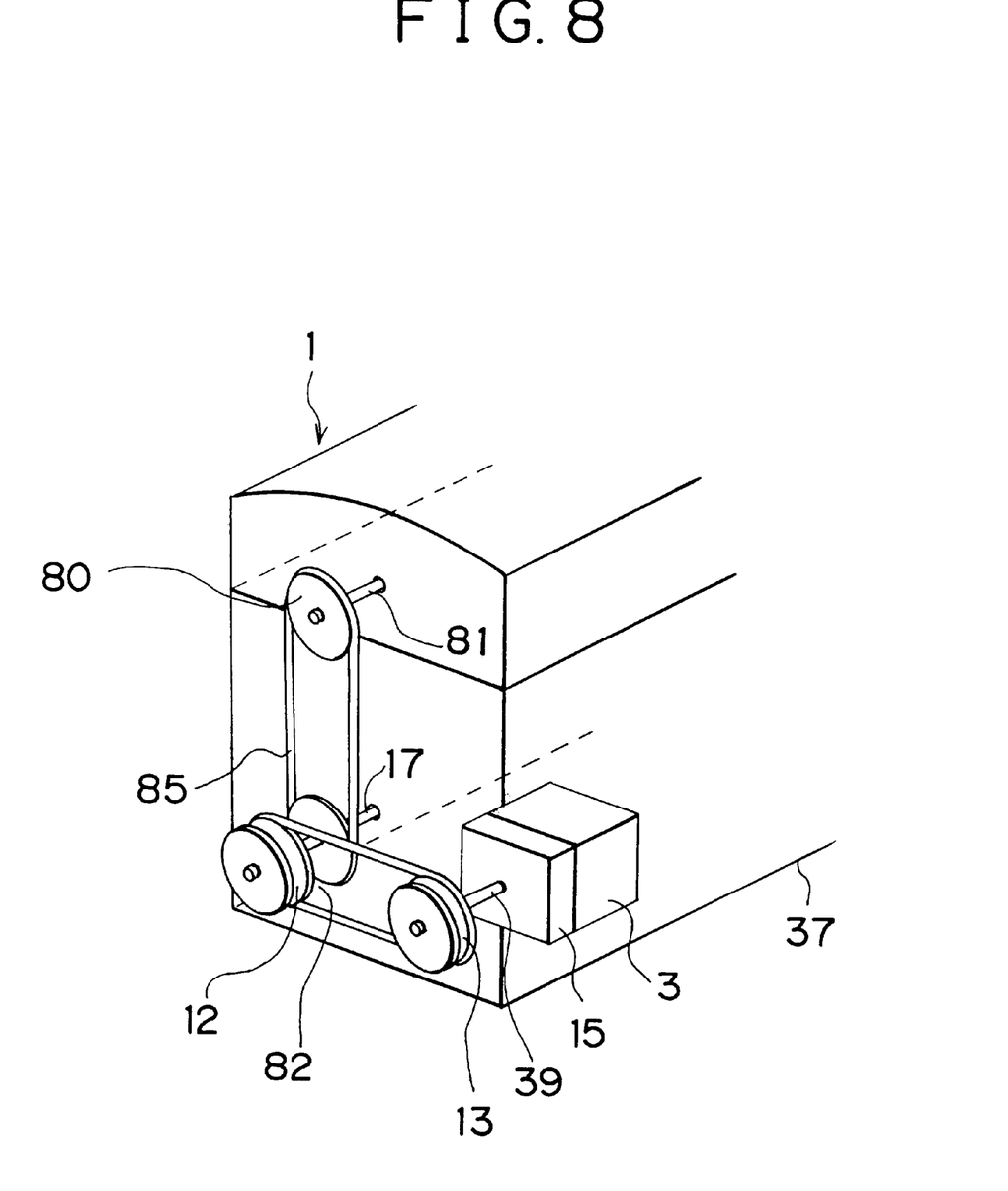
FIG. 8 is a schematic view showing the system of the fifth embodiment of the present invention.

FIGS. 5, 6, 7 and 8 are diagrams showing a fifth embodiment of the present invention. FIG. 5 shows the system of the fifth embodiment. FIG. 6 is a cross sectional view showing the detailed structures of the motor generator 3 and a reduction gear 15. FIG. 7 is a schematic view showing the detailed structure of a planetary gear mechanism when the reduction gear 15 is viewed from the axial direction. FIG. 8 is a schematic view showing the system of the fifth embodiment.

Referring to FIG. 5, there is provided an engine 1 and an automatic transmission 2 (hereinafter referred to as an "A/T") disposed adjacent to the engine 1. A motor generator 3 (hereinafter referred to as an "M/G") serves as a motor and an electric generator. A crank shaft 17 as a drive shaft for the engine 1 and the rotational shaft of the M/G 3 are disposed in parallel with and apart from each other. A reduction gear 15 is disposed between the M/G 3 and the crank shaft 17 so that rotation of the rotational shaft of the M/G 3 is reduced and transmitted to the crank shaft 17. A crank-side sprocket 12 (a rotative member) is connected and secured to the crank shaft 17. An M/G-side sprocket 13 is connected and secured to a rotative element of the reduction gear 15. A chain 18 is set between the crank-side sprocket 12 and the M/G-side sprocket 13.

FIG. 5 shows a pump 11 for a power steering unit and a compressor 16 for an air conditioner, each of which is an auxiliary machine. A pulley 10 is directly connected to the rotational shaft of the M/G 3. Pulleys 9 and 14 are secured to the respective ends of the rotational shafts of the pump 11 for a power steering unit and the compressor 16 for the air conditioner. A belt 8 is set among the pulleys 9, 10 and 14. The pulleys 9, 10, 14 and the belt 8, for example, constitute a power transmission means for transmitting rotation of the M/G 3 to the auxiliary machines 11, 16. In FIG. 5, the structure seems to show that the M/G-side sprocket 13 and the pulley 10 are coaxially and integrally connected to the rotational shaft of the M/G 3. However, the M/G-side sprocket 13 and the pulley 10 are not always rotated at the same speed as described later. The transmission of the rotational force is performed independently.

An inverter 4 is electrically connected to the M/G 3 and arranged to vary the amount of electric energy to be supplied from a battery 5 as a power source to the M/G 3 so as to control the number of revolutions of the M/G 3. The inverter 4 also performs control to store electric energy generated by the M/G 3 in the battery 5.

The M/G 3 is connected to an oil pump 19 for the A/T 2 through an electromagnetic clutch 27. An oil inlet pipe 24 is connected to the oil pump 19. An oil outlet pipe 25 is connected to the oil pump 19. The foregoing structure enables the M/G 3 to operate the oil pump 19 by bringing the electromagnetic clutch 27 to an engaged state while the engine is stopped at the economy running mode. This is because the starting clutch (not shown) disposed in the A/T 2 is arranged to be immediately engaged for driving the vehicle smoothly upon re-start of the engine.

Referring to FIG. 5, a controller 7 transmits, to the inverter 4, a signal for controlling the switching operation, ON-OFF control signals to the electromagnetic clutch 27 and ON-OFF control signals to the electromagnetic coil of the reduction gear 15 to be described later. The controller 7 receives a signal indicating the number of revolutions of the M/G 3, a signal for switching the economy running mode, a signal for switching the operation of the air conditioner, an engine status signal indicating, for example, the number of revolutions of the engine 1, a vehicle status signal (not shown) indicating the vehicle speed and the like and a status signal (not shown) of the A/T 2 indicating the range selected by the shift lever. In accordance with information indicated by the above-mentioned supplied signals, the controller 7 performs an operation for reading data from a memory and a calculating operation. Then, the controller 7 transmits arbitrary control signals to the reduction gear 15, the inverter 4, the electromagnetic clutch 27 and the like. The controller 7 may be formed as a so-called computer system provided with known units including a CPU, a RAM, a ROM, a bi-directional communication bus, interface circuits (a signal conversion circuit and the like) and an auxiliary memory.

The detailed structures of the M/G 3, the reduction gear 15 and a structure for mounting the M/G 3 on the engine 1 will now be described with reference to FIG. 6. One end of a casing 36 of the M/G 3 is secured to a bracket 38 of a cylinder block 37 of the engine 1 with bolts 40 such that a rotational shaft 39 is in parallel with the crank shaft 17 and the sprocket 13 secured to the rotative element of the reduction gear 15 is flush with the crank-side sprocket 12 secured to the crank shaft 17. The other end of the casing 36 is secured to extended first and second covers 64, 58 to be described later. In this embodiment, the M/G 3 is secured to a portion opposite to the A/T 2 of the engine 1 and adjacent to a sprocket 82 for operating a cam shaft 81 in the engine 1 secured to the crank shaft 17. A stator 41 is disposed in the casing 36 to surround a rotor 42. The rotor 42 is rotatively disposed opposite to the stator 41. The rotational shaft 39 is secured integrally with the rotor 42 for integral rotation. A radial bearing 43 is provided for rotatively supporting the rotational shaft 39.

The reduction gear 15 connected to the rotational shaft 39 will now be described with reference to FIGS. 6 and 7. The reduction gear 15 has a planetary gear unit including a sun gear 45, a pinion gears 46, a ring gear 47 and a carrier 55 therein. The sun gear 45 of the planetary gear unit is formed integrally with the rotational shaft 39. Three pinion gears 46 are disposed on outer periphery of the rotational shaft 39 at the same intervals of an angular degree of 120° and engaged with the sun gear 45. The relative positions among the three pinion gears 46 are kept unchanged. The three pinion gears 46 are able to turn around and move around the sun gear 45. Moreover, each of the pinion gears 46 is rotatively disposed in the ring gear 47 such that the inner periphery of the ring gear 47 is engaged with the pinion gear 46. A plate 48 spline-engaged to prevent relative rotation with respect to the ring gear 47 is disposed on the outer periphery of the ring gear 47. An electromagnetic clutch 49 is disposed opposite to the plate 48. The electromagnetic clutch 49 includes a coil 50 therein. When energizing the coil 50, the electromagnetic clutch 49 attracts the plate 48 by electromagnetic force. As a result, rotation of the ring gear 47 is inhibited. A one-way clutch 51 is disposed between a portion of the rotational shaft 39 closer to the rotor 42 than the sun gear 45 and the ring gear 47. The one-way clutch 51 allows the ring gear to rotate. The rotation of the ring gear 47 can be transmitted to the rotational shaft 39. On the other hand, the rotation of the rotational shaft 39 cannot be transmitted to the ring gear 47. It is controlled such that the speed of the rotational shaft 39 does not exceed the rotational speed of the ring gear 47 that has been enabled to rotate.

The inside portion of the casing 36 is sectioned into two spaces by a partition 52. The stator 41 and the rotor 42 are accommodated in one of the spaces, while the planetary gear unit, the one-way clutch 51, the electromagnetic clutch 49 and the plate 48 are accommodated in another space. The coil 50 of the electromagnetic clutch 49 is secured to the partition 52. A signal for energizing the coil 50 is transmitted from the controller 7. As shown in FIG. 6, a sealing member 53 is provided.

A carrier 55 is allowed to pass through each of the pinion gears 46 of the planetary gear unit through a needle bearing 54. Each carrier 55 is rotatively provided in the pinion gear 46. The carrier 55 is connected to a hollow rotative member 70 and movable around the sun gear 45 and able to rotate about the sun gear 45 integrally therewith such that the relative positions of the carriers 55 are maintained. The hollow rotative member 70 extends in the axial direction (to the left in the drawing) of the rotational shaft 39 and has a spline formed on the outer periphery for engagement with the M/G-side sprocket 13. The movement of the M/G-side sprocket 13 in the axial direction of the hollow rotative member 70 is restricted by a nut 56. The M/G-side sprocket 13 is connected to the crank-side sprocket 12 of the engine 1 through the chain 18. Thus, rotation between the crank shaft 17 and the rotational shaft 39 of the M/G 3 can be transmitted. A bearing 60 is provided for rotatively supporting the hollow rotative member 70.

As shown in FIGS. 6 and 8, a sprocket (a rotative member) 82 for operating the cam shaft 81 (see FIG. 8) of the engine 1 is secured to the crank shaft 17 at a position closer to the body of the engine 1 than the crank-side sprocket 12. The cam shaft 81 is disposed in parallel with the crank shaft 17. A cam-shaft sprocket 80 is secured to the cam shaft 81 to correspond to the sprocket 82 for operating the cam shaft 81. A chain 85 is provided between the sprocket 82 for operating the cam shaft 81 and the cam-shaft sprocket 80. Thus, rotations of the crank shaft 17 are transmitted to the cam shaft 81. The sprocket 82 for operating the cam shaft 81, the cam-shaft sprocket 80 and the chain 85 are disposed in a first space 63 defined by a cylinder block 37 and a first cover 64. Engine lubricating oil is supplied to the first space 63 so as to be circulated in the first space 63. The crank-side sprocket 12 for transmitting power between the M/G 3 and crank shaft 17 is secured to the crank shaft 17 at a portion outside of the sprocket 82 for operating the cam shaft 81 coaxially therewith. A second space 59 defined by the first cover 64 and the second cover 58 attached to the outside of the first cover 64 accommodates the crank-side sprocket 12, the M/G-side sprocket 13 and the chain 18. The first space 63 and the second space 59 communicate with each other so that lubricating oil supplied from the engine 1 is sufficiently supplied into the second space 59. The first cover 64 and the second cover 58 extend toward the M/G 3. Three portions (only one portion is illustrated) of a cover 68 are secured to the first cover 64 with bolts 65. Another portion of the cover 68 is secured to the first and second covers 64 and 58 with a bolt 67. Lubricating oil circulated to the first space 63 and the second space 59 is supplied through a pipe (not shown) and dropping for lubricating required portions. Lubricating oil is supplied to the planetary gear unit through a pipe (not shown) for lubricating each portion of the planetary gear unit, and then allowed to pass through the inside portion of the hollow rotative member 70. Then the lubricating oil is returned from the second space 59 to an oil pan (not shown) where it is mixed with oil which has been dropped after lubricating the other portions of the engine.

The rotational shaft 39 penetrates the hollow rotative member 70 and the second cover 58 to project to the outside portion. The pulley 10 for driving the auxiliary machines is secured to the rotational shaft 39 by spline engagement, such that the rotational shaft 39 and the pulley 10 can be integrally rotated. A sealing member 61 is disposed between the second cover 56 and the pulley 10.

FIG. 7 is a schematic cross sectional view showing the planetary gear unit when it is viewed from the axial direction of the rotational shaft 39. The relative positions of the sun gear 45, the pinion gears 46, the ring gear 47 and the carrier 55 can easily be understood from FIG. 7.

The operation of the fifth embodiment will now be described. When the economy running mode has been started by application of an ON signal for switching the economy running switch on, fuel supply to the engine 1 is interrupted if predetermined conditions are satisfied. Thus, the engine 1 is stopped. At this time, an ON signal is transmitted from the controller 7 to the electromagnetic clutch 27 which is brought to an ON state. Since the pump 11 for a power steering unit and the compressor 16 for air conditioner as the auxiliary machines are required to be operated while the engine 1 is stopped, electric energy of the battery 5 is supplied to the M/G 3 for rotation. The rotation of the M/G 3 is controlled by the controller 7 and the inverter 4. At this time, the controller 7 transmits an OFF signal to the electromagnetic clutch 49 in the reduction gear 15 to allow the ring gear 47 of the planetary gear unit to rotate.

When the rotational shaft 39 of the M/G 3 is rotated as shown in FIG. 6, the pulley 10 rotated integrally with the rotational shaft 39 drives the auxiliary machines 11, 16. On the other hand, the one-way clutch 51 prevents transmission of the rotation of the rotational shaft 39 to the ring gear 47. Since the carrier 55 is stopped by a sliding resistance of the engine 1 while the ring gear 47 is allowed to rotate, the pinion gears 46 only turn around without moving around the sun gear which is turning around. (the ring gear 47 inversely rotates around the sun gear 45 as the pinion gears 46 rotate). Thus, only the auxiliary machines are operated by the M/G 3. Therefore, the auxiliary machines can be operated with small electric power without operating the engine 1.

When the engine 1 is re-started at the economy running mode, the controller 7 transmits an ON signal to the electromagnetic clutch 49 of the reduction gear 15 to prevent the rotation of the ring gear 47. When the rotational shaft 39 of the M/G 3 is rotated in the foregoing state, the rotation of the sun gear 45 is transmitted to the pinion gears 46. Since the rotation of the ring gear 47 is prevented, the pinion gears 46 move around the sun gear 45 while turning around by themselves. Thus, the carrier 55 in each pinion gear 46 moves around the sun gear 45 so that the hollow rotative member 70 and the M/G-side sprocket 13 are rotated coaxially with the rotational shaft 39. At this time, the rotational speed of the M/G-side sprocket 13 is obtained by reducing the rotational speed of the rotational shaft 39 at a reduction ratio which is determined by the number of teeth of the sun gear 45 and that of the pinion gears 46. Therefore a sufficiently high torque for actuation is transmitted from the M/G 3 to the engine 1 because of the reduced speed of the sprockets 12, 13. Thus, the engine 1 is re-started. This leads to an effect of reducing the size of the M/G 3. The auxiliary machines 11, 16 are operated by the M/G 3 in synchronization with rotation of the rotational shaft 39.

When the power of the engine 1 or the kinetic energy of the vehicle is attempted to be recovered as electric energy while operating the engine or braking the vehicle, the rotation of the crank shaft 17 is transmitted to the M/G-side sprocket 13. Thus, the carrier 55 is rotated. At this time, the controller 7 transmits an OFF signal to the electromagnetic clutch 49 so that the ring gear 47 is brought to a rotative state. Although the rotational shaft 39 is caused to be stopped by a load generated in conjunction with electric power generation, the rotation of the carrier 55 causes the pinion gears 46 to turn and move around. Thus, ring gear 47 is rotated at an accelerated speed. Then, the one-way clutch 51 transmits the rotation of the ring gear 47 to the rotational shaft 39. Since the carrier 55 and the ring gear 47 integrally rotate about the sun gear 45, the rotation of the crank shaft 17 is transmitted to the M/G-side sprocket 13 and the rotational shaft 39 at the same speed. At this time, the rotational shaft 39 is rotated to cause the auxiliary machines 11, 16 to be operated and the M/G 3 to generate electric power simultaneously.

Since this embodiment is structured such that the portions corresponding to the clutches 26, 28 are contained in the reduction gear 15, the whole size can be reduced by eliminating these clutches 26, 28 as compared with the third embodiment.

This embodiment has the structure in which the second space 59 (a space projecting over the body of the engine 1) for accommodating the power transmission means (the chain 18) between the M/G 3 and the engine 1 is defined by the cylinder block 37, the first cover 64 and the second cover 58. The shape of the cylinder block 37, thus, is not required to be changed, resulting in cost reduction. The lubricating oil for the engine 1 can be used for circulation. Since the crank shaft 17 and the M/G 3 are connected with each other by the chain 18, excellent effect can be obtained in that power transmission can reliably be performed and noise generated during the operation can be reduced.

Although each of the first to fourth embodiments have the structure in which the power of the engine and that of the motor can be transmitted through the chain and the sprocket, another method may be employed. For example, connection using pulleys and belts, connection using gears and another connection method may be employed.

In the first to fourth embodiments, if it is structured such that the air conditioner is operated by the M/G 3 while the engine 1 is stopped, the compressor for the air conditioner does not have to be operated by the engine 1 at an idle state of the engine (revolutions in a poor fuel economy region) while the vehicle is stopped. The compressor 16 for air conditioner is rotated by the M/G 3 at the economy running mode while the engine 1 is stopped. The electric energy obtained from the battery 5 is recovered by operating the M/G 3 as an electric generator in a revolution region of the engine 1 where an excellent fuel efficiency can be realized during operation of the engine 1. Thus, the fuel efficiency of the vehicle can be further improved.

Since each of the first to fourth embodiments has the structure in which the engine 1 is not operated by the M(G 3 while the engine 1 is stopped, electric power required for the M/G 3 can be reduced. Thus, reduction in power consumption of the battery 5 can be realized.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element or embodiment, are also within the spirit and scope of the invention.

What is claimed is:

1. A power train system for a vehicle comprising:
   an engine operable in an economy running mode;
   a motor generator;
   an auxiliary machine that receives power from the motor generator when the engine is operating in the economy running mode;
   a clutch between the motor generator and the engine;
   a switch provided inside the vehicle that is operable to produce a signal to selectively activate the economy running mode; and
   a controller that operates the motor generator to supply power to the auxiliary machine during the economy running mode while disabling the clutch to prevent power from being transferred from the motor generator to the engine when the switch is operated to send to the controller the signal to activate the economy running mode.

2. A power train system according to claim 1, wherein said controller controls said clutch to disable power transmission between a drive shaft of said engine and a rotational shaft of said motor generator when the vehicle is stopped.

3. A power train system according to claim 2, wherein said clutch is an electromagnetic clutch for switching a mechanical connection/disconnection between the drive shaft of said engine and the rotational shaft of said motor generator.

4. A power train system according to claim 1, further comprising an auxiliary machine operated by said engine or said motor,
   wherein said auxiliary machine is connected to a rotational shaft of said motor generator.

5. A power train system according to claim 1, wherein said motor generator has a rotative function of rotating using electric energy and an electric-power generating function of generating electric-power using mechanical energy.

6. A power train system according to claim 1, wherein the motor generator is connected to a drive shaft of the engine,
   a transmission mechanism is disposed between the engine and the motor generator and is capable of transmitting rotation of a rotational shaft of said motor generator to the drive shaft of said engine at a changed speed,
   the auxiliary machine is connected to the rotational shaft of said motor generator and is operated by said engine or said motor generator, and
   said transmission mechanism reduces the speed of rotation of the rotational shaft of said motor generator and transmits the rotation to the drive shaft of said engine when said auxiliary machine is operated by said motor generator in a state where said engine is stopped.

7. A power train system according to claim 6, wherein said clutch interrupts transmission of rotation of the rotational shaft of said motor generator to the drive shaft of said engine when the auxiliary machine is operated by said motor generator in a state where said engine is stopped.

8. A power train system according to claim 6, further comprising:
   first and second rotative members having rotational shafts disposed in parallel with the drive shaft of said engine;
   a first cover joined to said engine to form a first space in association with said engine for accommodating said first rotative member;
   a second cover joined to an outside of said first cover to form a second space in association with said first cover for accommodating said second rotative member;
   a motor rotative member provided for the rotational shaft of said motor generator so as to be rotated in conjunction therewith; and
   power transmission means for connecting said motor rotative member to either said first rotative member or said second rotative member such that power can be transmitted,
   wherein said motor rotative member and said power transmission means are accommodated in either said first space or said second space.

9. A power train system according to claim 8, wherein said first and second spaces are communicated with each other and formed separately from the outside of the engine, and a lubricant is supplied into said first and second spaces.

10. A power train system according to claim 9, wherein said lubricant is a lubricant used for engine lubrication and enabled to circulate to and from the engine.

11. A method for operating a power train system for a vehicle including an engine operable in an economy running mode, an electrically powered motor generator, an auxiliary machine that receives power from at least one of the engine and the motor generator, and a clutch between the engine and the motor generator, the method comprising:
   providing a switch operable by a driver inside the vehicle to selectively activate the economy running mode;
   supplying power to the auxiliary machine from the motor generator when the economy running mode is selected; and
   disabling the clutch to prevent power from being transferred from the motor generator to the engine when the switch is operated to produce a signal that activates the economy running mode.

* * * * *